United States Patent
Park et al.

(10) Patent No.: US 11,502,739 B2
(45) Date of Patent: Nov. 15, 2022

(54) METHOD FOR SELECTING BEAM AND ELECTRONIC DEVICE THEREOF

(71) Applicant: Samsung Electronics Co., Ltd., Suwon-si (KR)

(72) Inventors: Jungsik Park, Suwon-si (KR); Woosup Lee, Suwon-si (KR); Sehwan Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/039,748

(22) Filed: Sep. 30, 2020

(65) Prior Publication Data

US 2021/0099221 A1    Apr. 1, 2021

(30) Foreign Application Priority Data

Sep. 30, 2019  (KR) .................. 10-2019-0120958

(51) Int. Cl.
*H04B 7/08* (2006.01)
*H04B 7/06* (2006.01)
(Continued)

(52) U.S. Cl.
CPC .......... *H04B 7/088* (2013.01); *H04B 7/0617* (2013.01); *H04B 17/318* (2015.01);
(Continued)

(58) Field of Classification Search
CPC .... H04B 7/088; H04B 7/0617; H04B 17/318; H04B 7/0695; H04B 7/0408;
(Continued)

(56) References Cited

U.S. PATENT DOCUMENTS

| 7,962,150 B2 | 6/2011 | Hertzog et al. |
| 9,871,570 B1 | 1/2018 | Kerhuel |

(Continued)

FOREIGN PATENT DOCUMENTS

| KR | 10-2019-0022181 A | 3/2019 |
| KR | 10-2020-0054006 A | 5/2020 |

OTHER PUBLICATIONS

International Search Report and Written Opinion of the International Searching Authority in connection with International Application No. PCT/KR2020/013255 dated Jan. 22, 2021, 6 pages.

(Continued)

*Primary Examiner* — Fred A Casca

(57) ABSTRACT

An electronic device according to various embodiments of the present disclosure includes: a first communication circuit; a second communication circuit; a processor operatively coupled with the first communication circuit and the second communication circuit; and a memory operatively coupled with the processor. The memory may store instructions, when executed, causing the processor to receive from a base station (BS) a synchronization signal including identification information of the BS via the first communication circuit, identify a direction from the electronic device to the BS by transmitting and receiving at least one signal with respect to the BS via the second communication circuit based on the identification information of the BS, and perform beam training by using some beams corresponding to the identified direction among a plurality of beams supported by the electronic device. Other embodiments are also possible.

18 Claims, 14 Drawing Sheets

(51) Int. Cl.
*H04B 17/318* (2015.01)
*H04W 16/28* (2009.01)
*H04W 24/10* (2009.01)
*H04W 56/00* (2009.01)

(52) U.S. Cl.
CPC ........... *H04W 16/28* (2013.01); *H04W 24/10* (2013.01); *H04W 56/001* (2013.01)

(58) Field of Classification Search
CPC .... H04B 1/0064; H04W 16/28; H04W 24/10; H04W 56/001
See application file for complete search history.

(56) References Cited

U.S. PATENT DOCUMENTS

| | | | |
|---|---|---|---|
| 10,666,335 B2 | 5/2020 | Lee et al. | |
| 2012/0287797 A1* | 11/2012 | Basson | H04W 16/28 370/252 |
| 2016/0043781 A1 | 2/2016 | Cho et al. | |
| 2018/0351708 A1 | 12/2018 | Wang et al. | |
| 2020/0150262 A1 | 5/2020 | Kim et al. | |
| 2020/0328797 A1* | 10/2020 | Gajula | H04W 52/367 |
| 2020/0336178 A1* | 10/2020 | Ma | H04B 7/0413 |
| 2021/0076434 A1* | 3/2021 | Hariharan | H04W 76/14 |
| 2021/0184733 A1* | 6/2021 | Cao | H04B 7/0695 |

OTHER PUBLICATIONS

Huawei, et al., "Enhancements on multi-beam operation," R1-1901568, 3GPP TSG RAN WG1 Meeting #96 Athens, Greece, Feb. 25-Mar. 1, 2019, 10 pages.

Intel Corporation,"Analysis of Techniques for NR UL Positioning," R1-1900513, 3GPP TSG RAN WG1 Ad-Hoc Meeting 1901, Taipei, Taiwan, Jan. 21-25, 2019, 15 pages.

NTT Docomo, Inc (Rapporteur), "RAN WG's progress on NR WI in the August and September meetings 2017," R2-1710077, 3GPP TSG-RAN WG2 #99bis, Oct. 9-13, 2017, Prague, Czech Republic, 120 pages.

Qualcomm Incorporated, "Beam management for NR," R1-1807341, 3GPP TSG-RAN WG1 Meeting 93, Busan, Korea, May 21-25, 2018, 11 pages.

* cited by examiner

METHOD FOR SELECTING BEAM AND ELECTRONIC DEVICE THEREOF

CROSS-REFERENCE TO RELATED APPLICATION

This application is based on and claims priority under 35 U.S.C. § 119 to Korean Patent Application No. 10-2019-0120958, filed on Sep. 30, 2019, in the Korean Intellectual Property Office, the disclosure of which is incorporated by reference herein in its entirety.

BACKGROUND

1. Field

Various embodiments of the present disclosure relate to a method of selecting a beam, and an electronic device thereof.

2. Description of Related Art

To meet a demand on wireless data traffic which has been in an increasing trend after a 4th Generation (4G) communication system was commercialized, there is an ongoing effort to develop an improved 5th Generation (5G) communication system or a pre-5G communication system. For this reason, the 5G communication system or the pre-5G communication system is called a beyond 4G network communication system or a post Long Term Evolution (LTE) system.

To achieve a high data transfer rate, the 5G communication system is considered to be implemented in an mmWave band (e.g., such as a 60 GHz band). To reduce a propagation path loss at the mmWave band and to increase a propagation delivery distance, beamforming, massive Multiple Input Multiple Output (MIMO), Full Dimensional MIMO (FD-MIMO), array antenna, analog beam-forming, and large scale antenna techniques are under discussion in the 5G communication system.

In addition, to improve a network of a system, techniques such as an evolved small cell, an advanced small cell, a cloud Radio Access Network (RAN), an ultra-dense network, Device to Device (D2D) communication, a wireless backhaul, a moving network, cooperative communication, Coordinated Multi-Points (CoMP), and reception interference cancellation, or the like are being developed in the 5G communication system.

In addition thereto, Hybrid Frequency shift keying and Quadrature Amplitude Modulation (FQAM) and Sliding Window Superposition Coding (SWSC) as an Advanced Coding Modulation (ACM) technique and Filter Bank Multi Carrier (FBMC), Non Orthogonal Multiple Access (NOMA), and Sparse Code Multiple Access (SCMA), or the like as an advanced access technology are being developed in the 5G system.

SUMMARY

An electronic device may update a reception (RX) beam to receive a signal, based on a training signal received with a designated period from a base station (BS). In order to support seamless communication even in a mobile situation, the electronic device may store information of neighboring BSs, a signal status, and information on a transmission (TX) beam of the neighboring BSs and the RX beam of the electronic device for each of the neighboring BS. Meanwhile, upon detecting a situation in which a communication environment with the BS deteriorates (e.g., a situation in which an obstacle is located between the BS and the electronic device, a situation in which the electronic devices moves, or a situation in which a posture of the electronic device is changed), the electronic device may have to re-perform a beam training operation which searches for the TX beam and RX beam for each of the neighboring BSs. Data transmission/reception between the electronic device and a serving BS is influenced while the electronic device searches for the TX beam and RX beam for the neighboring BSs. The greater the number of neighboring BSs which have to search for the RX beam, the greater the influence may be.

Various embodiments of the present disclosure disclose a method of minimizing an operation (or time) in which an electronic device searches for a TX beam and RX beam for each of neighboring BSs.

An electronic device according to various embodiments of the present disclosure may include: a first communication circuit; a second communication circuit; a processor operatively coupled with the first communication circuit and the second communication circuit; and a memory operatively coupled with the processor. The memory may store instructions, when executed, causing the processor to receive from a base station (BS) a synchronization signal including identification information of the BS via the first communication circuit, identify a direction from the electronic device to the BS by transmitting and receiving at least one signal with respect to the BS via the second communication circuit based on the identification information of the BS, and perform beam training by using some beams corresponding to the identified direction among a plurality of beams supported by the electronic device.

A method of selecting a beam in an electronic device according to various embodiments of the present disclosure may include: receiving from a BS a synchronization signal including identification information of the BS via a first communication circuit of the electronic device; identifying a direction from the electronic device to the BS by transmitting and receiving at least one signal with respect to the BS via the second communication circuit of the electronic device on the basis of the identification information of the BS; and performing beam training by using some beams corresponding to the identified direction among a plurality of beams supported by the electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain embodiments of the disclosure will be more apparent from the following detailed description, taken in conjunction with the accompanying drawings, in which.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

A hardware-based approach is described for example in the various embodiments of the disclosure described hereinafter. However, since the various embodiments of the disclosure include a technique in which hardware and software are both used, a software-based approach is not excluded in the embodiments of the disclosure.

Figure 1:
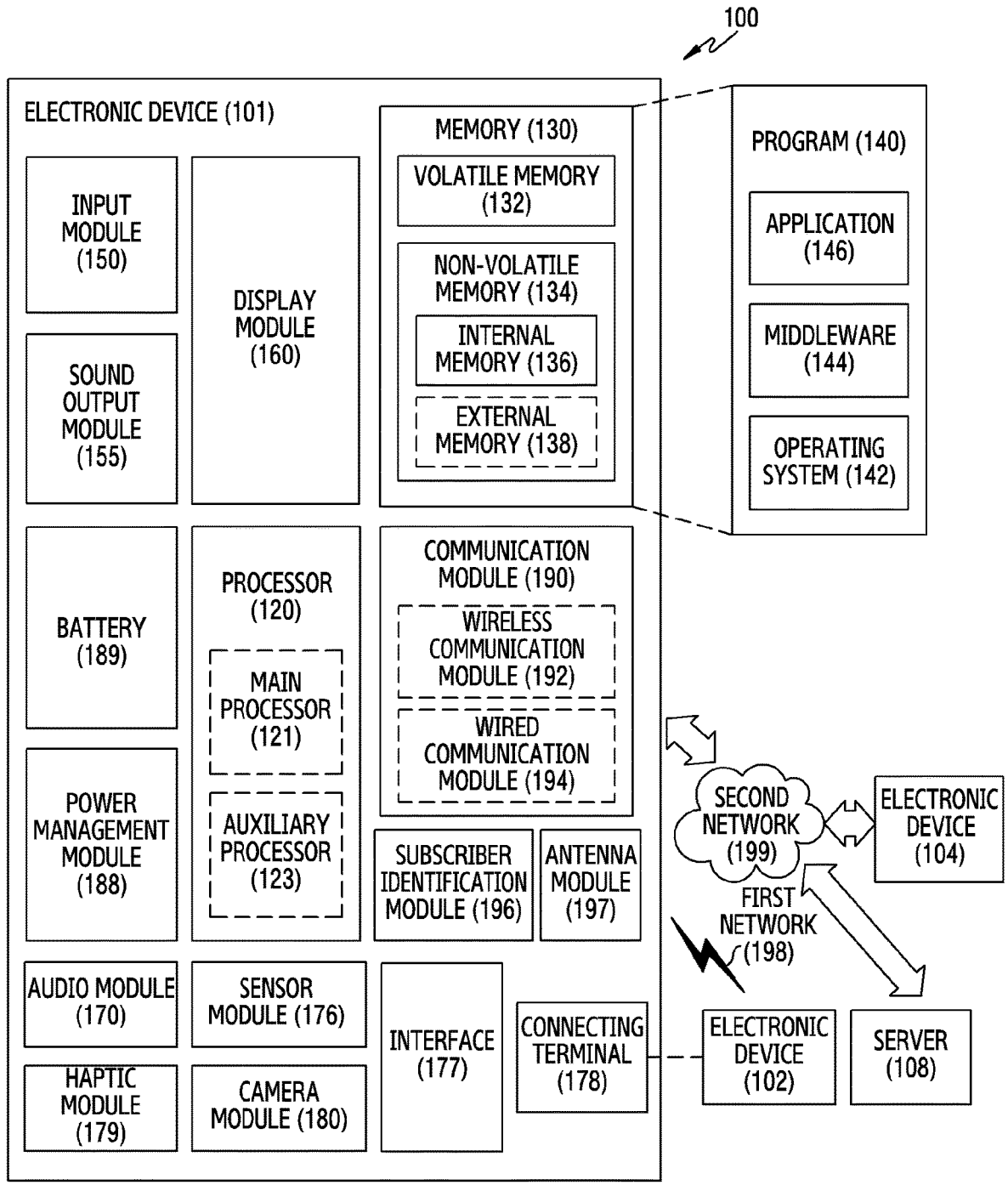
FIG. 1 is a block diagram of an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. In some embodiments, some (e.g., the sensor module 176, the camera module 180, or the antenna module 197) of the components may be implemented as single integrated circuitry.

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, if the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., a neural network processing device) may include a hardware structure specialized for processing an artificial intelligence model. The artificial intelligence model may be created through machine learning. Such learning may be performed, for example, in the electronic device 101 on which artificial intelligence is performed, or may be performed through a separate server (e.g., the server 108). A learning algorithm may include, for example, supervised learning, unsupervised learning, semi-supervised learning, or reinforcement learning, but is not limited to the aforementioned example. The artificial intelligence model may include a plurality of artificial neural network layers. The artificial neural network may be one of a Deep Neural Network (DNN), a Convolutional Neural Networks (CNN), a Recurrent Neural Network (RNN), a Restricted Boltzmann Machine (RBM), a Deep Belief Network (DBN), a Bidirectional Recurrent Deep Neural Network (BRDNN), a deep Q-network, or a combination of at least two of those elements, but is not limited to the aforementioned example. In addition to the hardware structure, additionally or alternatively, the artificial intelligence model may include a software structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, a key (e.g., button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for an incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155, or an external electronic device (e.g., an electronic device 102)(e.g., a speaker or a headphone) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network evolved from a 4G network and a next-generation communication technology, for example, a New Radio (NR) access technology. The NR access technology may support enhanced Mobile Broadband (eMBB), massive Machine Type Communications (mMTC), or Ultra-Reliable and Low-Latency Communications (URLLC). The wireless communication module 192 may support, for example, a high frequency band (e.g., an mmWave band) to achieve a high data rate. The wireless communication module 192 may support various technologies for securing performance in a high frequency band, for example, beamforming, massive array Multiple-Input and Multiple-Output (MIMO), and Full-Dimensional MIMO (FD-MIMO), an array antenna, analog beam-forming, or a large scale antenna. The wireless communication module 192 may support various requirements defined in the electronic device 101, an external electronic device (e.g., the electronic device 104), or a network system (e.g., the second network 199). According to an embodiment, the wireless communication module 192 may support a peak data rate (e.g., 20 Gbps or more) for realizing eMBB, a loss coverage (e.g., 164 dB or less) for realizing mMTC, or U-plane latency (e.g., 0.5 ms or less or a round trip of 1 ms or less for each of downlink (DL) and uplink (UL)) for realizing URLCC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas (e.g., array antenna). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may construct an mmWave antenna module. According to an embodiment, the mmWave antenna module may include a printed circuit board, an RFIC disposed on or adjacent to a first face (e.g., a bottom face) of the printed circuit board and capable of supporting a designated high frequency band (e.g., an mmWave band), and a plurality of antennas (e.g., an array antenna) disposed on or adjacent to a second face (e.g., a top face or a side face) of the printed circuit board and capable of transmitting or receiving a signal in the designated high frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To this end, for example, technologies of cloud computing, distributed computing, Mobile Edge Computing (MEC), or client-server computing may be used. The electronic device 101 may provide an ultra-low latency service by using, for example, distributed computing or mobile edge computing. In another embodiment, the external electronic device 104 may include an Internet of Things (IoT) device. The server 108 may be an intelligent server using machine learning and/or neural networks. According to an embodiment, the external electronic device 104 or the server 108 may be included in the second network 199. The electronic device 101 may be applied to an intelligent service (e.g., a smart home, a smart city, a smart car, or health care) based on a 5G communication technique and an IoT related technique.

Figure 2:
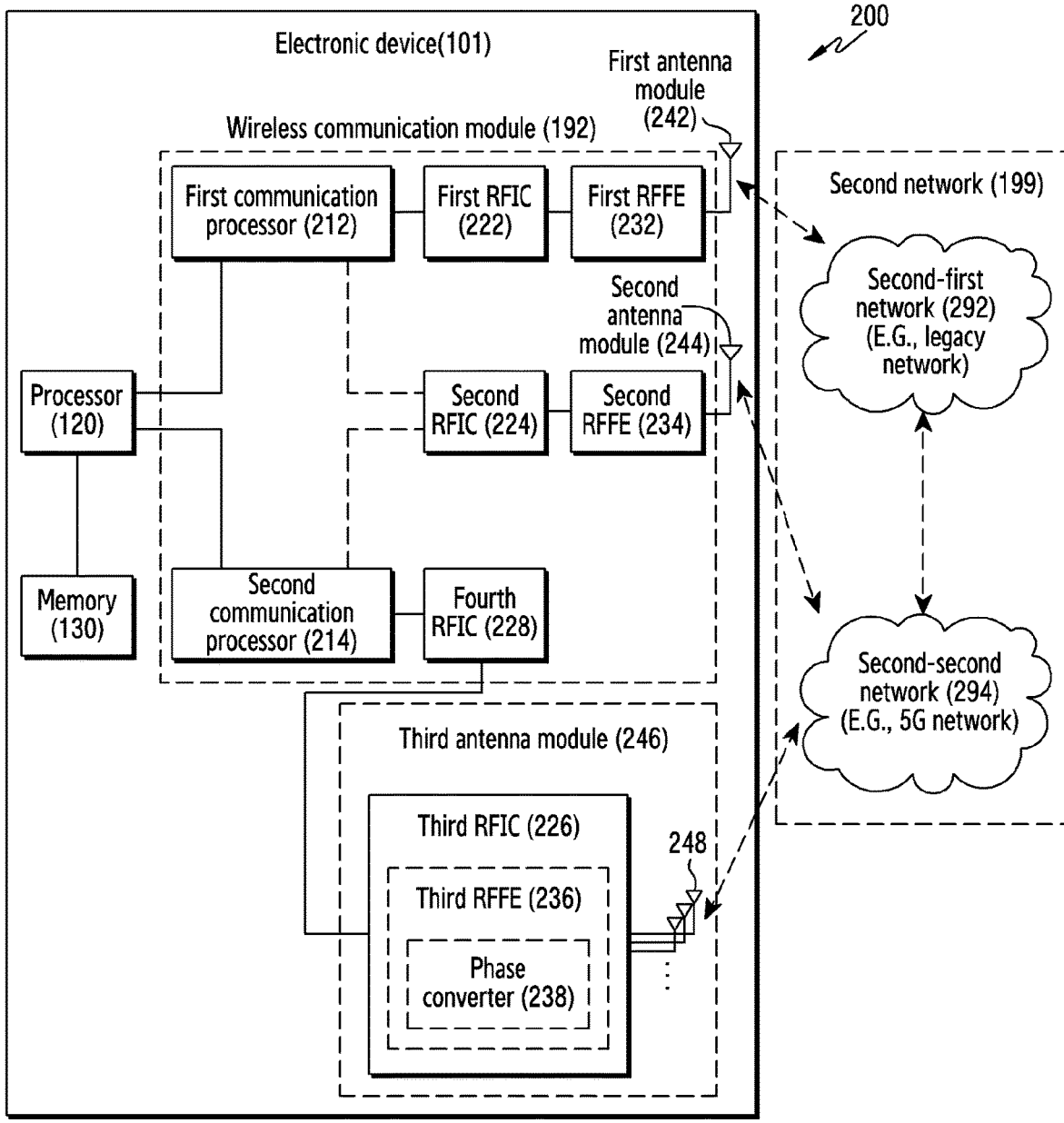
FIG. 2 is a block diagram of an electronic device for supporting legacy network communication and 5th Generation (5G) network communication according to various embodiments.

FIG. 2 is a block diagram of an electronic device for supporting legacy network communication and 5th Generation (5G) network communication according to various embodiments Referring to FIG. 2, the electronic device 101 may include a first communication processor 212, a second communication processor 214, a first RFIC 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and memory 130. The second network 199 may include a second-first network 292 and a second-second network 294. According to another embodiment, the electronic device 101 may further include at least one of the components illustrated in FIG. 2, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may comprise at least a part of a wireless (e.g., RF) communication module 192. According to another embodiment, the fourth RFIC 228 may be omitted, or may be included as a part of the third RFIC 226.

According to various embodiments, the first communication processor 212 may establish a communication channel in a band to be used for a wireless communication with the second-first network 292, and may support legacy network communication over the established communication channel. According to various embodiments, the second-first network 292 may be a legacy network including, for example, and without limitation, a second generation (2G), 3G, 4G, long-term-evolution (LTE) network, or the like. The second communication processor 214 may include establish a communication channel corresponding to a designated band (e.g., about 6 GHz to about 60 GHz) in a band to be used for wireless communication with the second-second network 294, and may support 5G network communication through the established communication channel. According to various embodiments, the second-second network 294 may, for example, and without limitation, be a 5G network defined in the 3GPP. In addition, according to an embodiment, the first communication processor 212 and/or the second communication processor 214 may establish a communication channel corresponding to another designated band (e.g., about 6 GHz or lower) in the band to be used for RF communication with the second-second network 294, and may support 5G network communication through the established communication channel. According to an embodiment, the first communication processor 212 and the second communication processor 214 may be implemented in a single chip or in a single package. According to various embodiments, the first communication processor 212 and/or the second communication processor 214 may be formed in a single chip or a single package with the processor 120, an auxiliary processor 123, and/or a communication module 190.

According to an embodiment, during transmission, the first RFIC 222 may convert a baseband signal generated by the first communication processor 212 into an RF signal ranging, for example, from about 700 MHz to about 3 GHz to be used in the second-first network 292 (e.g., a legacy network). During reception, an RF signal may be acquired from the second-first network 292 (e.g., the legacy network) through an antenna (e.g., the first antenna module 242) and may be pre-processed through an RFFE (e.g., the first RFFE 232). The first RFIC 222 may convert the pre-processed RF signal into a baseband signal to be processed by the first communication processor 212.

According to an embodiment, during transmission, the second RFIC 224 may convert the baseband signal generated by the first communication processor 212 and/or the second communication processor 214 into an RF signal in, for example, a Sub6 band (e.g., about 6 GHz or lower) (hereinafter, referred to as "5G Sub6 RF signal") to be used in the second-second network 294 (e.g., a 5G network). During reception, the 5G Sub6 RF signal may be acquired from the second-second network 294 (e.g., a 5G network) through an antenna (e.g., the second antenna module 244), and may be pre-processed through an RFFE (e.g., the second RFFE 234). The second RFIC 224 may convert the pre-processed 5G Sub6 RF signal into a baseband signal so as to be processed by a corresponding one of the first communication processor 212 and the second communication processor 214.

According to an embodiment, the third RFIC 226 may convert the baseband signal generated by the second communication processor 214 into an RF signal in a 5G Above6 band (e.g., about 6 GHz to about 60 GHz) (hereinafter, referred to as "5G Above6 RF signal") to be used in the second-second network 294 (e.g., a 5G network). During reception, the 5G Above6 RF signal may be acquired from the second-second network 294 (e.g., a 5G network) through an antenna (e.g., the second antenna module 244), and may be pre-processed through the third RFFE 236. The third RFIC 226 may convert the pre-processed 5G Above6 RF signal into a baseband signal to be processed by the second communication processor 214. According to an embodiment, the third RFFE 236 may be formed as a part of the third RFIC 226.

According to an embodiment, the electronic device 101 may include a fourth RFIC 228 separately from or as at least a part of the third RFIC 226. In this case, the fourth RFIC 228 may convert a baseband signal generated by the second communication processor 214 into an RF signal (hereinafter, referred to as "IF signal") in an intermediate frequency band (e.g., about 9 GHz to about 11 GHz), and may then deliver the IF signal to the third RFIC 226. The third RFIC 226 may convert the IF signal into a 5G Above6 RF signal. During reception, the 5G Above6 RF signal may be acquired from the second-second network 294 (e.g., a 5G network) through an antenna (e.g., the antenna 248), and may be configured into an IF signal through the third RFIC 226. The fourth RFIC 228 may convert the IF signal into a baseband signal to be processed by the second communication processor 214.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or a single package. According to an embodiment, at least one of the first antenna module 242 and the second antenna module 244 may be omitted or combined with another antenna module so as to process RF signals of multiple corresponding bands.

According to an embodiment, the third RFIC 226 and the antenna 248 may be disposed on the same substrate to comprise a third antenna module 246. For example, the wireless (e.g., RF) communication module 192 and/or the processor 120 may be placed on a first substrate (e.g., a main PCB). In such a case, the third RFIC 226 may be disposed on a partial area (e.g., a lower face) of a second substrate (e.g., a sub-PCB) separate from the first substrate, and the antenna 248 may be disposed on another partial area (e.g., an upper face), thereby forming the third antenna module 246. By disposing the third RFIC 226 and the antenna 248 on the same substrate, it is possible to reduce the length of the transmission line therebetween. Thus, it may be possible to reduce the loss (e.g., attenuation) of a signal in an RF band (e.g., about 6 GHz to about 60 GHz) to be used, for example, for 5G network communication by the transmission line. As a result, the electronic device 101 is able to improve the quality or speed of communication with the second-second network 294 (e.g., a 5G network).

According to an embodiment, the antenna 248 may be an antenna array including multiple antenna elements that are capable of being used for beamforming. In this case, the third RFIC 226 may include multiple phase shifters (i.e., phase converters) 238 corresponding to the multiple antenna elements, for example, as a part of the third RFFE 236. During transmission, each of the multiple phase shifters 238 may convert the phase of a 5G Above6 RF signal to be transmitted to the outside of the electronic device 101 (e.g., a base station of a 5G network) through a corresponding antenna element. During reception, each of the multiple phase shifters 238 may convert the phase of the 5G Above6 RF signal received from the outside into the same or substantially the same phase through the corresponding antenna element. This enables transmission or reception through beamforming between the electronic device 101 and the outside.

According to various embodiments, the second-second network 294 (e.g., a 5G network) may be operated independently from the second-first network 292 (e.g., a legacy network) (e.g., stand-alone (SA)), or may be operated in the state of being connected to the second-first network 292 (e.g., non-stand alone (NSA)). For example, in a 5G network, only an access network (e.g., a 5G radio access network (RAN) or a next-generation RAN (NG RAN)) may exist but a core network (e.g., a next-generation core (NGC)) may not exist. In this case, after accessing the access network of the 5G network, the electronic device 101 may access an external network (e.g., the Internet) under the control of the core network (e.g., an evolved packet core (EPC)) of a legacy network. Protocol information for communication with a legacy network (e.g., LTE protocol information) or protocol information for communication with a 5G network (e.g., new radio (NR) protocol information) may be stored in the memory 230, and may be accessed by another component (e.g., the processor 120, the first communication processor 212, or the second communication processor 214).

Figure 3:
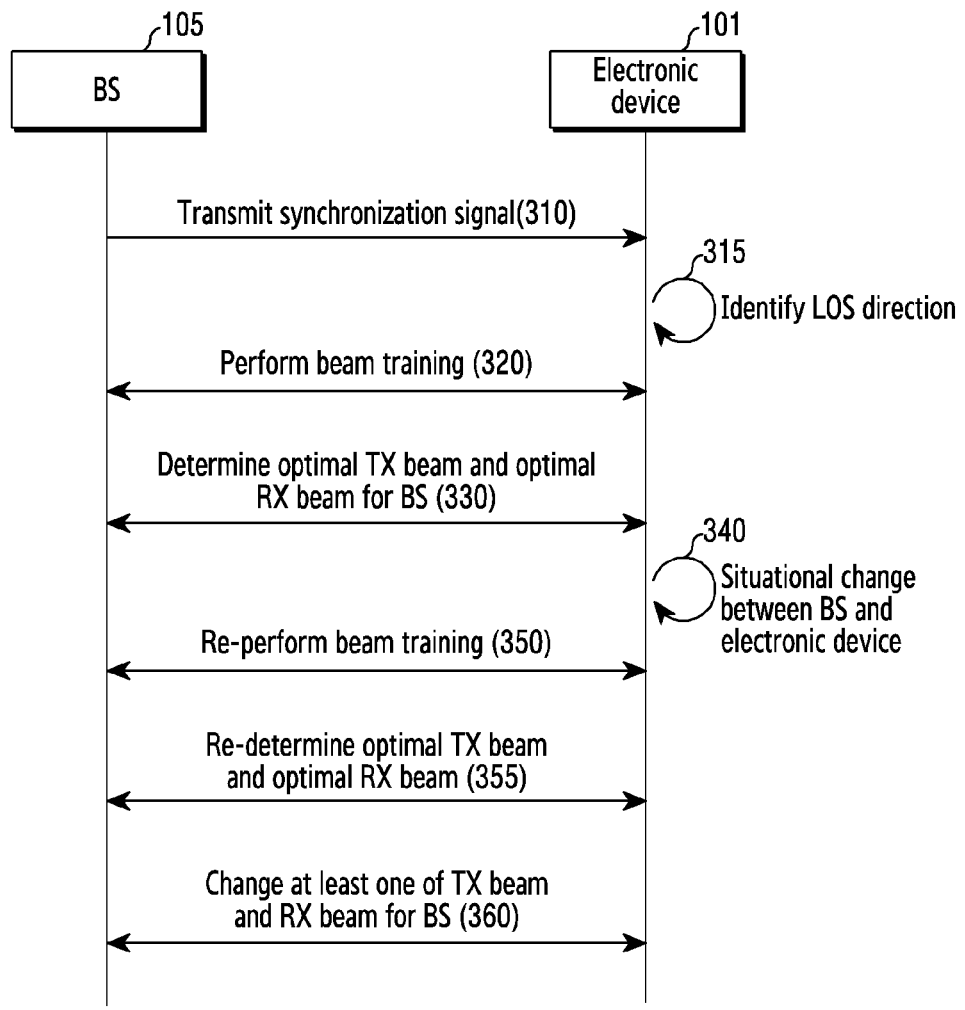
FIG. 3 is an exemplary diagram illustrating an example of a signal flow between an electronic device and a Base Station (BS) according to various embodiments.
Figure 4:
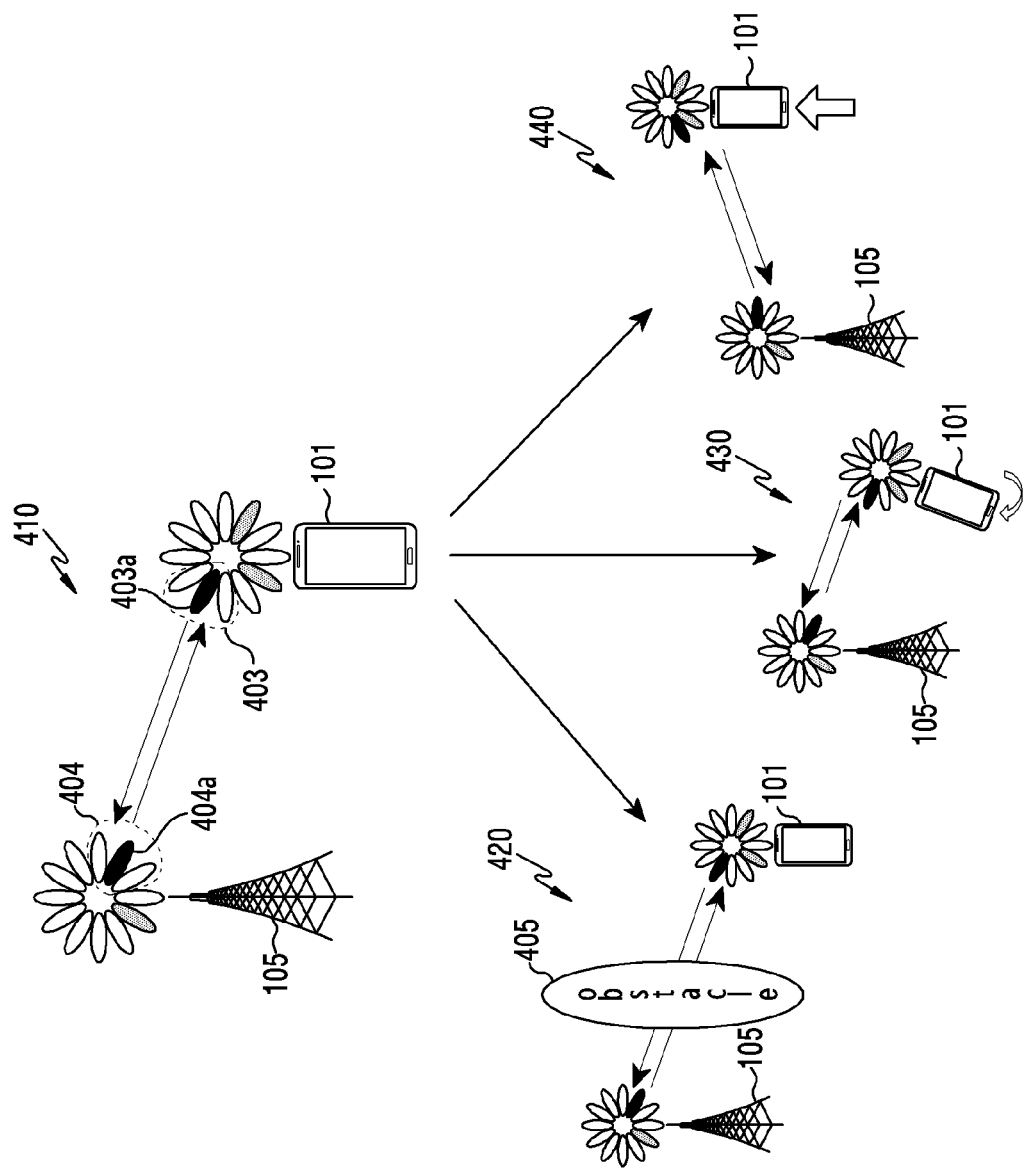
FIG. 4 is an exemplary diagram illustrating a situation in which an electronic device and a BS perform or re-perform beam training according to various embodiments.

FIG. 3 is an exemplary diagram illustrating an example of a signal flow between an electronic device and a base station (BS) according to various embodiments, and FIG. 4 is an exemplary diagram illustrating a situation in which an electronic device and a BS perform or re-perform beam training according to various embodiments.

According to various embodiments, the electronic device 101 may be a device which receives a wireless communication service from a BS 105. According to various embodiments, the electronic device 101 may be a device having mobility. For example, the electronic device 101 may include a mobile phone, a smart phone, a music player, a portable game console, a navigation system, or a laptop computer. According to various embodiments, the electronic device 101 may be referred to as a mobile station, a terminal station (STA), or a user equipment.

According to various embodiments, the BS 105 may provide a wireless communication service to the electronic device 101. According to various embodiments, the BS 105 may be referred to as a base station, an enhanced node B (eNB), a next generation node B (gNB), or an access point (AP).

According to various embodiments, the electronic device 101 and the BS 105 may support at least one of legacy network communication, new radio (NR) network communication (e.g., 5G network communication (e.g., wigig, millimeter wave (mm WAVE))), and ultra wide band (UWB) network communication. The UWB may reliably transmit data at a rate of hundreds of Mbps by using a transmission band of at least hundreds of MHz (e.g., 500 MHz). The UWB may have a frequency band of about 3GHz to 10 GHz.

According to various embodiments, the electronic device 101 and/or the BS 105 may support a positioning technology (e.g., time of flight (TOF), time of arrival (TOA), or angle of arrival (AOA)) capable of measuring a distance and/or an angle by using a propagation (arrival) time and/or strength of a signal of wireless communication (e.g., Bluetooth, UWB, or Wi-Fi).

Referring to FIG. 3 and FIG. 4, in operation 310, the BS 105 may transmit a synchronization signal to the electronic device 101. The synchronization signal may be transmitted to the electronic device 101 through communication of a first network (e.g., a second-second network 294), and may include identification information of the BS 105. The identification information of the BS may include a UWB mac ID of the BS. According to an embodiment, the synchronization signal may further include at least one of the number of available beams of the BS 105, a transmission timing of the synchronization signal, a transmission duration of the synchronization signal or a transmission period of the synchronization signal, and a UWB authentication code.

According to various embodiments, the synchronization signal may include a reference signal, a beam reference signal (BRS), or a synchronization signal block (SSB).

In operation 315, the electronic device 101 may identify (or determine) a Line of Site (LOS) direction from the electronic device 101 to the BS 105. For example, the electronic device 101 may identify the LOS direction by performing second network communication (e.g., UWB network communication) with respect to the BS 105 on the basis of the identification information of the BS 105, which is included in the synchronization signal.

According to some embodiments, when the electronic device 101 receives the synchronization signal from a plurality of BSs, the second network communication may be performed with respect to each BS to measure an angle or a distance between the BSs 105, and the LOS direction for each BS may be identified (or determined).

In operation 320, the electronic device 101 may perform beam training. The beam training may be an operation of determining a TX beam (e.g., a best TX beam) of the BS 105 and/or an RX beam (e.g., a best RX beam) of the electronic device 101, i.e., beams suitable for communication between the electronic device 101 and the BS 105 among a plurality of beams supported by the electronic device 101 and each of the BSs 105. For example, the BS 105 may sequentially transmit at least one training signal to the electronic device 101 through some beams (e.g., some beams corresponding to the LOS direction) among a plurality of beams (e.g., a first beam to an n-th beam) supported by the BS 105 during a designated transmission period (e.g., a synchronization signal transmission period). The electronic device 101 may sequentially receive the at least one training signal received during the transmission period through one beam (e.g., the first beam) among a plurality of beams (e.g., the first beam to an m-th beam) supported by the electronic device 101. The electronic device 101 may measure a received signal strength indicator (RSSI) for each of at least one training signal received through the first beam.

The BS 105 may sequentially transmit at least one training signal to the electronic device 101 through the some beams during a next transmission period. The electronic device 101 may receive the at least one training signal received during the next transmission period through another single beam (e.g., a second beam) among the plurality of beams of the electronic device 101. The electronic device 101 may measure an RSSI for each of at least one training signal received through the second beam.

The aforementioned beam training may be performed on some beams (e.g., beams corresponding to the LOS direction) among the plurality of beams supported by the electronic device 101. For example, if the electronic device 101 has two beams (hereinafter, RX beams) corresponding to the LOS direction and the BS 105 has three beams (hereinafter, TX beams) corresponding to the LOS direction, the electronic device 101 may search and receive three TX beams with respect to a first RX beam to measure respective RSSIs, and may search and receive three TX beams with respect to a second RX beam to measure respective RSSIs. For another example, if the electronic device 101 has three RX beams corresponding to the LOS direction and the BS 105 has four TX beams corresponding to the LOS direction, the electronic device 101 may search and receive four TX beams with respect to a first RX beam to measure respective RSSIs, may search and receive four TX beams with respect to a second RX beam to measure respective RSSIs, may search and receive four TX beams with respect to a third RX beam to measure respective RSSIs.

According to some embodiments, the number of the RX beams and/or TX beams may be one.

In operation 330, the electronic device 101 may determine an optimal TX beam and optimal RX beam for the BS 105, based on a measurement result. For example, the electronic device 101 may identify a TX beam having a greatest value among values of the measured RSSIs and an RX beam for receiving the TX beam and thus determine the optimal TX beam and optimal RX beam for the BS 105. According to some embodiments, the electronic device 101 may transmit to the BS 105 information on the TX beam having the greatest RSSI so that the BS 105 can determine the optimal TX beam among the plurality of TX beams.

According to various embodiments, as shown in the figure by a reference numeral 410 of FIG. 4, the electronic device 101 may perform first network communication with the BS 105 through an optimal RX beam 403a determined among some RX beams 403 and an optimal TX beam 404a determined among some TX beams 404.

In operation 340, the electronic device 101 may detect a situational change with respect to the BS 105. For example, the electronic device 101 may detect the situational change by identifying whether the RSSI is decreased to be less than or equal to a designated threshold. The situational change may include a first situation in which an obstacle 405 is located between the electronic device 101 and the BS 105 as shown in the figure by a reference numeral 420 of FIG. 4, a second situation in which a posture of the electronic device 101 is changed as shown in the figure by a reference numeral 430, and a third situation in which a position of the electronic device 101 is changed as shown in the figure by a reference numeral 440. Meanwhile, the situational change may include a situation in which at least two of the first situation to the third situation are combined.

According to various embodiments, when signal strength between an optimal TX beam and an optimal RX beam is less than or equal to a threshold due to the situational change, a beam failure may occur, and the electronic device 101 may perform a beam failure recovery. According to some embodiments, the beam failure recovery may be included in operation 350 described below. For example, the beam failure recovery of the electronic device 101 may be included in at least some of operations of performing operation 350.

In operations 350 and 355, the electronic device 101 and the BS 105 may re-perform beam training, and may re-determine the optimal TX beam and the optimal RX beam. The operations 350 and 355 are respectively similar to the operations 320 and 330. Some TX beams and/or some RX beams for re-performing the beam training in the operation 350 may be the same as or different from some TX beams and/or RX beams for performing the beam training in the operation 320. For example, as shown in the figure by the reference numeral 420 of FIG. 4, some TX beams and some RX beams for re-performing the beam training in the operation 350 may be the same as some TX beams and some RX beams for performing the beam training in the operation 320. As shown in the figure by a reference numeral 430 of FIG. 4, some TX beams for re-performing the beam training in the operation 350 may be the same as some TX beams for performing the beam training in the operation 320, and some RX beams for re-performing the beam training in the operation 350 may be different from some RX beams for performing the beam training in the operation 320. As shown in the figure by a reference numeral 440 of FIG. 4, some TX beams and some RX beams for re-performing the beam training in the operation 350 may be different from some TX beams and some RX beams for performing the beam training in the operation 320.

In operation 360, the electronic device 101 may change at least one of the optimal TX beam and optimal RX beam for the BS 105. For example, when a state of a communication channel between the electronic device 101 and the BS 105 is changed due to the situational change (e.g., an obstacle, a posture change, a position change, etc.), the electronic device 101 may change at least one of the optimal TX beam and optimal RX beam for the BS 105 to another beam suitable for the changed situation, based on the state change of the communication channel.

According to various embodiments, the beam training in operations 320 and 350 may be referred to as beam signaling or beam measurement.

The electronic device 101 according to the aforementioned embodiment of the present disclosure may rapidly determine the optimal TX beam and RX beam by performing beam training on some of RX beams corresponding to an LOS direction determined through second network communication, without having to perform beam training on all of a plurality of supported RX beams (or beam patterns). In addition, the electronic device 101 may prevent (or avoid) electric current consumption by searching some of TX beams corresponding to the LOS direction rather than a plurality of TX beams (or TX beam patterns) supported by the BS 105.

Meanwhile, although it is described above that the BS supports NR network communication and UWB network communication, an embodiment of the present disclosure is not limited thereto. According to some embodiments, the NR network communication and the UWB network communication may be supported by different BSs. For example, a first BS may support the NR network communication, and a second BS may support the UWB network communication. The second BS may be located physically away from the first BS. The second BS may provide information (data) capable of predicting a distance and/or angle between the first BS and the second BS so that the electronic device 101 can predict a direction of the first BS. The information is measured previously, and may include a distance between the first BS and the second BS and/or an angle measured at a designated reference point.

Figure 5:
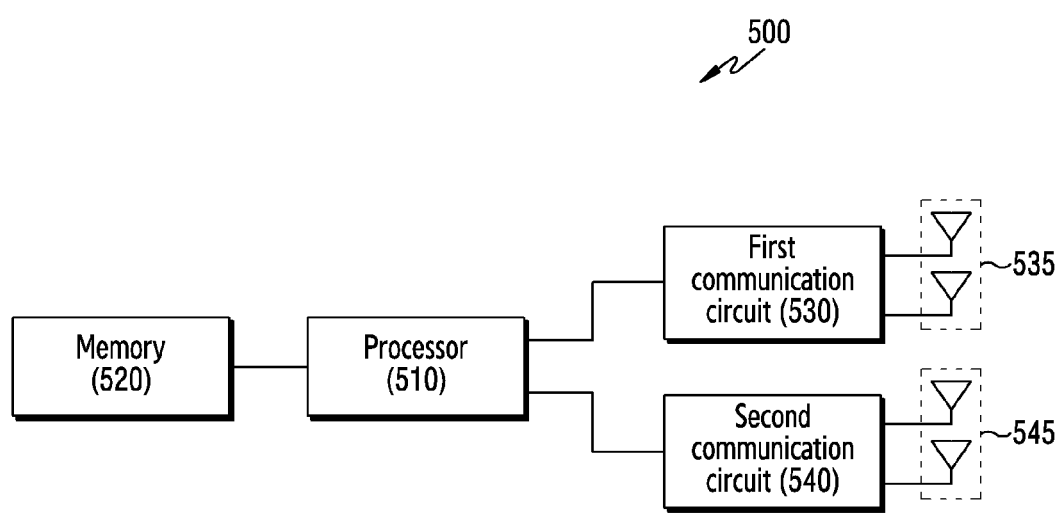
FIG. 5 is a block diagram of an electronic device according to various embodiments.

FIG. 5 is a block diagram of an electronic device according to various embodiments.

Referring to FIG. 5, an electronic device 500 (e.g., the electronic device 101 of FIG. 1 to FIG. 4) may include at least one of a processor 510 (e.g., the processor 120 of FIG. 1 and FIG. 2), a memory 520 (e.g., the memory 130 of FIG. 1 and FIG. 2), a first communication circuit 530 (e.g., the second communication processor 214 and third RFIC 226 of FIG. 2), and a second communication circuit 540. However, the present disclosure is not limited thereto. For example, the electronic device 500 may further include a display (not shown) and/or an input/output device (not shown).

According to various embodiments, the processor 510 may control a plurality of hardware or software components connected to the processor 510 by driving an operating system or an application program, and may process a variety of data including multimedia data and may perform an arithmetic operation. According to an embodiment, the processor 510 may be implemented, for example, with a system on chip (SoC). According to an embodiment, the processor 510 may further include a graphic processing unit (GPU) and/or an image signal processor. The processor 510 may process an instruction or data, which is received from at least one of different components, by loading the instruction or data to the memory 520 and may store a variety of data in the memory 520.

According to various embodiments, the processor 510 may receive a synchronization signal from a BS (e.g., the BS 105 of FIG. 3 and FIG. 4) via the first communication circuit 530. The processor 510 may analyze the synchronization signal to identify at least one of the number of beams supported by the BS, a transmission timing of the synchronization signal, a transmission duration of the synchronization signal, a transmission period of the synchronization signal, first identification information or the BS (e.g., a base station identify code), second identification information (e.g., UWB mac ID) of the BS, and authentication information (e.g., UWB authentication information). According to an embodiment, the synchronization signal may include at least one of the number of beams supported by the BS, the transmission timing of the synchronization signal, the transmission duration of the synchronization signal, the transmission period of the synchronization signal, the first identification information of the BS, the second identification information of the BS, and the authentication information.

According to various embodiments, the processor 510 may identify a direction and/or distance from the electronic device 500 to the BS via the second communication circuit 540 in response to receiving the synchronization signal from the BS. For example, the processor 510 may transmit a poll signal to the BS on the basis of identification information of the BS, and upon receiving a response signal from the BS, may identify the direction and/or distance from the electronic device 500 to the BS on the basis of the response signal. According to an embodiment, the response signal of the BS may include information on a difference between a time at which the response signal of the BS is transmitted and a time at which the BS receives the poll signal transmitted from the electronic device 500.

According to various embodiments, the processor 510 may determine an optimal TX beam and optimal RX beam for data communication with the BS by using some RX beams corresponding to a direction (an LOS direction) from the electronic device 500 to the BS among a plurality of RX beams supported by the electronic device 500 and some TX beams corresponding to the LOS direction among a plurality of TX beams supported by the BS. For example, the processor 510 may determine the optimal TX beam and optimal RX beam for data communication with the BS by performing beam training by the use of some RX beams corresponding to the LOS direction among the plurality of RX beams and some TX beams corresponding to the LOS direction among the plurality of TX beams. According to an embodiment, the processor 510 may transmit information on a TX beam having a greatest RSSI among some TX beams to the BS via the first communication circuit 530. The BS may determine the optimal TX beam for the electronic device 500 on the basis of the received information on the TX beam.

According to an embodiment, if strength of a signal received through the optimal RX beam determined through beam training is less than or equal to a designated threshold, the processor 510 may re-determine the optimal RX beam and optimal TX beam for data communication with the BS by re-performing beam training by the use of some RX beams among a plurality of RX beams supported by the electronic device 500 and some TX beams among a plurality of TX beams. The processor 510 may perform data communication with the BS by using the re-determined optimal RX beam and optimal TX beam. According to some embodiments, the processor 510 may re-perform beam training by using all of the plurality of RX beams and the plurality of TX beams.

According to various embodiments, the processor 510 may include a UWB manager which manages a Bluetooth communication function provided by the electronic device 500, manages a UWB communication function provided by the electronic device and the Bluetooth manager providing an API related to Bluetooth communication to an application program, and provides an API related to UWB to the application program.

According to various embodiments, the first communication circuit 530 may be electrically coupled with a first antenna module 535, and may transmit a signal to the outside or receive a signal from the outside via the first antenna module 535. According to an embodiment, the first communication circuit 530 may be a new radio (NR) communication circuit supporting NR network communication. For example, the first communication circuit 530 may support an NR network communication service via the first antenna module 535 capable of transmitting and receiving a radio signal of about 6 GHz to 60 GHz.

According to various embodiments, the second communication circuit 540 may be electrically coupled with a second antenna module 545, and may transmit a signal to the outside or receive a signal from the outside via the second antenna module 545. According to an embodiment, the second communication circuit 540 may be a UWB communication circuit supporting UWB network communication. For example, the second communication circuit 540 may support a UWB network communication service via the second antenna module 545 capable of transmitting and receiving a radio signal of about 3 GHz to 10 GHz.

Although it is described in FIG. 5 that the electronic device 500 performs NR network communication and UWB network communication with the BS via the first communication circuit 530 and the second communication circuit 540, an embodiment of the present disclosure is not limited thereto. According to some embodiments, the electronic device 500 may perform NR network communication and UWB network communication with different BSs via the first communication circuit 530 and the second communication circuit 540. For example, the electronic device 500 may perform NR network communication with a first BS via the first communication circuit 530, and may perform UWB network communication with a second BS via the second communication circuit 540. The processor 510 of the electronic device 500 may receive information (data) capable of predicting a distance and/or angle between the first BS and the second BS from the second BS via the second communication circuit 540 so that the electronic device 101 can predict a direction of the first BS. The information is measured previously, and may include a distance between the first BS and the second BS and/or an angle between the first BS and the second BS, measured at a designated reference point.

Figure 6A:
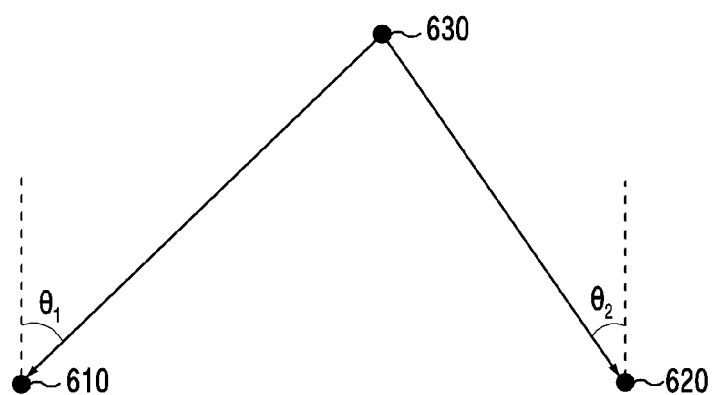
FIG. 6A is an exemplary diagram illustrating a method in which an electronic device measures a direction of an external electronic device according to various embodiments.
Figure 6B:
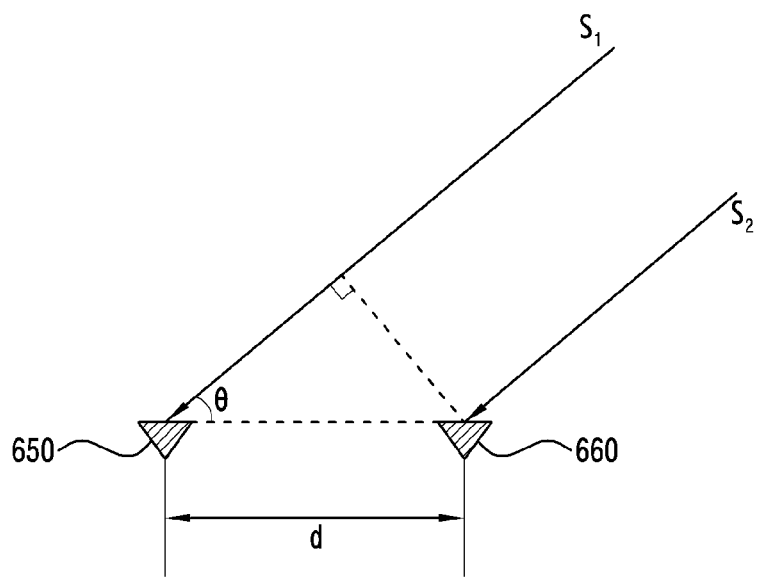
FIG. 6B is an exemplary diagram illustrating a method in which an electronic device measures a direction of an external electronic device according to various embodiments.

FIG. 6A and FIG. 6B are exemplary diagrams illustrating a method in which an electronic device measures a direction of an external electronic device according to various embodiments.

According to various embodiments, the electronic device (e.g., the electronic device 101 of FIG. 1 to FIG. 4 or the electronic device 500 of FIG. 5) may identify a location of an external electronic device 630 and/or a distance from the electronic device by using a UWB signal received from the external electronic device 630 (e.g., the BS 105 of FIG. 3 and FIG. 4). According to an embodiment, the electronic device may identify the location and/or distance of the external electronic device 630 by using a positioning technology such as TOF, TOA, or AOA.

According to various embodiments, the electronic device may include a first antenna 610 (e.g., one antenna of the second antenna module 545 of FIG. 5) and a second antenna 620 (e.g., another antenna of the second antenna module 545 of FIG. 5). As shown in FIG. 6A, the electronic device may identify the location and distance of the external electronic device 630 by transmitting/receiving a signal (e.g., a poll signal) with respect to the external electronic device 630 via the first antenna 610 and the second antenna 620. For example, the electronic device may identify angles θ1 and θ2 of respective signals received from the external electronic device 630 by using an array of the first antenna 610 and second antenna 620, and may identify a direction from the electronic device to the external electronic device 630 on the basis of the identified angles θ1 and θ2.

According to various embodiments, as shown in FIG. 6B, the electronic device may identify a location and distance of the external electronic device 630 by transmitting/receiving a signal with respect to the external electronic device 630 via a third antenna 650 (e.g., one antenna of the second antenna module 545 of FIG. 5) and a fourth antenna 660 (e.g., another antenna of the second antenna module 545 of FIG. 5). For example, upon receiving a signal S1 from the external electronic device via the third antenna 650, the electronic device may identify an angle θ, at which the signal S1 is received, by measuring a phase difference of the signal S1 arriving at the third antenna 650 and the fourth antenna 660, and may identify a direction from the electronic device to the external electronic device on the basis of the identified angle θ. Herein, the angle θ at which the signal S1 is received may be identified through equation (1) below.

$$\Phi = \frac{2\pi}{\lambda} d \sin\theta \quad (1)$$

In equation (1), φ may denote a difference between a phase of the signal S1 received via the third antenna 650 and a phase of the signal S1 received via the fourth antenna 660, λ may denote a wavelength of the signal S1, and d may denote a distance between the third antenna 650 and the fourth antenna 660. For another example, the electronic device may identify an angle θ at which the signal S1 is received by measuring a time difference of the signals S1 arriving at the third antenna 650 and the fourth antenna 660, and may identify a direction from the electronic device to the external electronic device on the basis of the identified angle θ. Herein, the angle θ at which the signal S1 is received may be identified through equation (2) below.

$$t = \frac{d}{c} \sin\theta \quad (2)$$

In equation (2), t may denote a time difference when the signal S1 arrives at each of the third antenna 650 and the fourth antenna 660, d may denote a distance between the third antenna 650 and the fourth antenna 660, and c may denote a speed of the signal S1.

Figure 7:
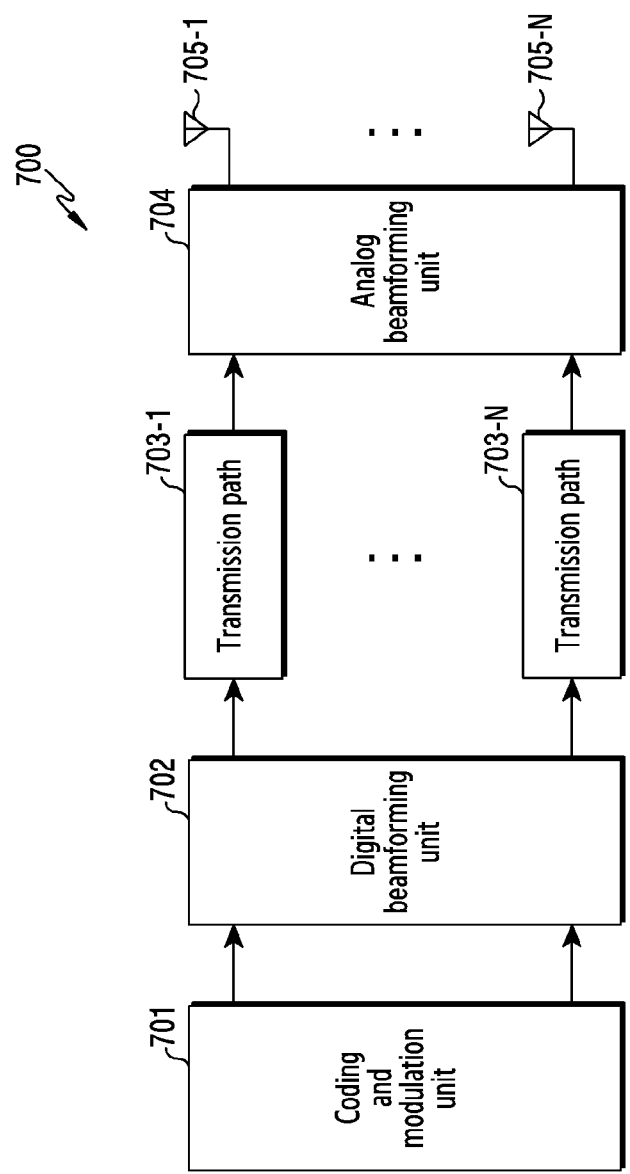
FIG. 7 is a block diagram of a communication circuit according to various embodiments.

FIG. 7 is a block diagram of a communication circuit according to various embodiments.

Referring to FIG. 7, a communication circuit 700 (e.g., the wireless communication module 192 of FIG. 1, the second communication processor 214 and third RFIC 226 of FIG. 2, or the first communication circuit 530 of FIG. 5) may include a coding and modulation unit 701, a digital beamforming unit 702, a plurality of transmission paths 703-1 to 703-N, an analog beamforming unit 704, and a plurality of antennas 705-1 to 705-N (e.g., the antenna 248 of FIG. 2, the first antenna module 535 of FIG. 5).

According to various embodiments, the coding and modulation unit 701 may perform channel encoding. For the channel encoding, the coding and modulation unit 701 may use at least one of a low density parity check (LDPC) code, a convolution code, and a polar code. The coding and modulation unit 701 may generate modulation symbols by performing constellation mapping.

According to various embodiments, the digital beamforming unit 702 may perform beamforming on a digital signal (e.g., modulation symbols). To this end, the digital beamforming unit 702 may multiply the modulation symbols by beamforming weights. Herein, the beamforming weights are used to change a magnitude and phase of a signal and may be referred to as a "precoding matrix," a "precoder," or the like. The digital beamforming unit 702 may output modulation symbols subjected to digital beamforming to the plurality of transmission paths 703-1 to 703-N. In an embodiment, according to a multiple input multiple output (MIMO) transmission scheme, the modulation symbols may be multiplexed, or the same modulation symbols may be provided to the plurality of transmission paths 703-1 to 703-N.

According to various embodiments, the plurality of transmission paths 703-1 to 703-N may convert the digital signals subjected to digital beamforming into an analog signal. Each of the plurality of transmission paths 703-1 to 703-N may include an inverse fast Fourier transform (IFFT) calculation unit, a cyclic prefix (CP) inserting unit, a DAC, an up-conversion unit. The CP inserting unit is for an orthogonal frequency division multiplexing (OFDM) scheme and may be excluded when a different physical layer scheme (e.g., filter bank multi-carrier (FBMC)) is applied. For example, the plurality of transmission paths 703-1 to 703-N may provide an independent signal processing process for a plurality of streams generated through digital beamforming. For another example, according to an implementation, some of components of the plurality of transmission paths 703-1 to 703-N may be commonly used.

According to various embodiments, the analog beamforming unit 704 may perform beamforming on an analog signal. To this end, the analog beamforming unit 704 may multiply the analog signals by beamforming weights. Herein, the beamforming weights may be used to change a magnitude and phase of a signal. In an embodiment, according to a connection structure between the plurality of transmission paths 703-1 to 703-N and antennas 705-1 to 705-N, the analog beamforming unit 704 may be configured variously. For example, each of the plurality of transmission paths 703-1 to 703-N may be coupled with one antenna array. For another example, the plurality of transmission paths 703-1 to 703-N may be coupled with one antenna array. For another example, the plurality of transmission paths 703-1 to 703-N may be adaptively coupled with one antenna array, or may be coupled with two or more antenna arrays.

According to various embodiments of the present disclosure, an electronic device (e.g., the electronic device 101, 500) may comprise: a first communication circuit (e.g., the second communication processor 214 and the third RFIC 226, the first communication circuit 530); a second communication circuit (e.g., the second communication circuit 540); a processor (e.g., the processor 120, 510) operatively coupled with the first communication circuit and the second communication circuit; and a memory (e.g., the memory 130, 520) operatively coupled with the processor, wherein the memory stores instructions, when executed, causing the processor to: receive from a Base Station (BS) (e.g., the BS 105) a synchronization signal comprising identification information of the BS via the first communication circuit; identify a direction from the electronic device to the BS by transmitting and receiving at least one signal with respect to the BS via the second communication circuit based on the identification information of the BS; and perform beam training by using some beams corresponding to the identified direction among a plurality of beams supported by the electronic device.

According to various embodiments, the first communication circuit may comprise a new radio (NR) communication circuit, and the second communication circuit may comprise an ultra wide band (UWB) communication circuit.

According to various embodiments, the instructions may cause the processor to: transmit a poll signal to the BS based on the identification information of the BS; receive a response signal for the poll signal from the BS; and identify a distance between the electronic device and the BS and a direction from the electronic device to the BS based on the response signal.

According to various embodiments, the instructions may cause the processor to: determine an optimal transmission (TX) beam and optimal reception (RX) beam for the BS through the beam training; and perform data communication with the BS by using the determined optimal TX beam and the determined optimal RX beam.

According to various embodiments, the instructions may cause the processor to transmit information on the determined optimal TX beam to the BS via the first communication circuit in response to determining the optimal TX beam.

According to various embodiments, the instructions may cause the processor to: identify strength of a signal received through the optimal RX beam while performing data communication with the BS; if the identified signal strength is less than or equal to reference strength, determine whether a posture of the electronic device is changed from a posture of a timing at which the beam training is performed; and if the posture of the electronic device is changed from the posture of the timing at which the beam training is performed, correct the optimal RX beam based on an angle at which the posture of the electronic device is changed.

According to various embodiments, the instructions may cause the processor to determine whether the posture of the electronic device is changed from the posture of the timing at which the beam training is performed, by identifying the direction from the electronic device to the BS via the second communication circuit.

According to various embodiments, the electronic device further may comprise a sensor module (e.g., the sensor module 176). The instructions may cause the processor to determine whether the posture of the electronic device is changed from the posture of the timing at which the beam training is performed based on information acquired via the sensor module.

According to various embodiments, the instructions may cause the processor to: receive a different synchronization signal comprising the identification information of the BS from the BS via the first communication circuit, if the posture of the electronic device is not changed; identify a direction from the electronic device to the BS by transmitting/receiving at least one signal with respect to the BS via the second communication circuit based on the BS's identification information comprised in the received different synchronization signal; and change the optimal RX beam for the BS by re-performing beam training by the use of some beams corresponding to the identified direction among a plurality of beams supported by the electronic device.

According to various embodiments, the instructions may cause the processor to: identify strength of a signal received through the optimal RX beam while performing data communication with the BS; and if the identified signal strength is less than or equal to reference strength, change the optimal RX beam for the BS by re-performing beam training by the use of some beams among a plurality of beams supported by the electronic device.

Figure 8:
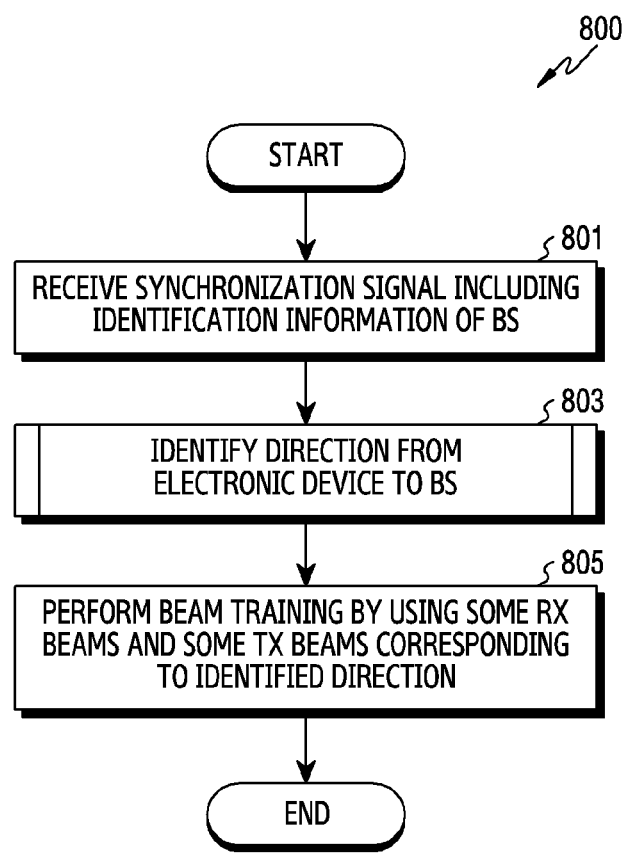
FIG. 8 is a flowchart illustrating a method of selecting a beam in an electronic device according to various embodiments.
Figure 9:
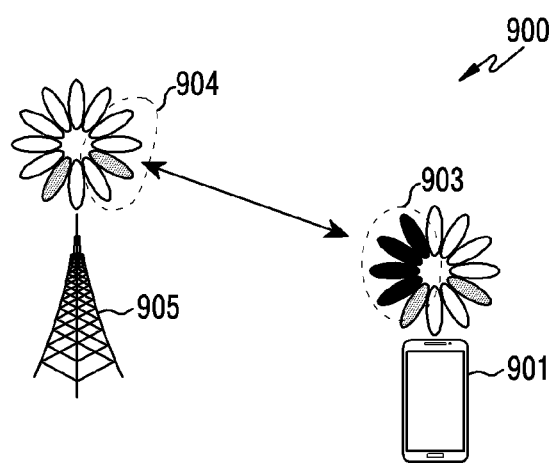
FIG. 9 is an exemplary diagram illustrating a method of selecting a beam in an electronic device according to various embodiments.

FIG. 8 is a flowchart 800 illustrating a method of selecting a beam in an electronic device according to various embodiments, and FIG. 9 is an exemplary diagram 900 illustrating a method of selecting a beam in an electronic device according to various embodiments.

Referring to FIG. 8 and FIG. 9, in operation 801, a processor (e.g., the processor 120 of FIG. 1 and FIG. 2, the processor 510 of FIG. 1) of the electronic device (e.g., the electronic device 101 of FIG. 1 to FIG. 4, the electronic device 500 of FIG. 5) may receive from a BS (e.g., the BS 105 of FIG. 3 and FIG. 4) a synchronization signal including identification information of the BS via a first communication circuit (e.g., the second communication processor 214 and third RFIC 226 of FIG. 3, the first communication circuit 530 of FIG. 5). According to an embodiment, the first communication circuit may include a communication circuit supporting an NR communication network. According to an embodiment, the identification information of the BS may include a UWB mac ID. According to an embodiment, in addition to the identification information of the BS, the synchronization signal may further include at least one of the number of beams supported by the BS, a transmission timing of the synchronization signal, a transmission duration of the synchronization signal, a transmission period of the synchronization signal, and authentication information (e.g., UWB authentication information).

In operation 803, the processor may identify a direction from the electronic device to the BS, in response to receiving the synchronization signal. For example, the processor may transmit a poll signal to the BS via a second communication circuit (e.g., the second communication circuit 540) on the basis of the BS's identification information included in the synchronization signal, and upon receiving a response signal from the BS, may identify a distance and/or direction from the electronic device to the BS on the basis of the response signal. According to an embodiment, the second communication circuit may include a communication circuit supporting a UWB communication network. Herein, operation 803 will be described in detail with reference to FIG. 10A and FIG. 10B.

In operation 805, in response to identifying the direction from the electronic device to the BS, the processor may perform beam training by using some RX beams corresponding to an identified direction among a plurality of RX beams supported by the electronic device and some TX beams among a plurality of TX beams supported by the BS. For example, as shown in FIG. 9, the processor may perform beam training by using some RX beams 903 and some TX beams 904 corresponding to a direction in which a BS 905 is located among a plurality of RX beams supported by an electronic device 901. The electronic device 901 may search some TX beams 904 for the respective some RX beams 903.

According to various embodiments, the processor may determine an optimal TX beam and optimal RX beam for data communication with the BS through beam training. For example, the processor may determine a TX beam having a greatest RSSI among some TX beams 904 as the optimal TX beam. The processor may determine an RX beam for receiving the optimal TX beam among some RX beams 903 as the optimal RX beam. The processor may perform data communication with the BS by using the determined optimal TX beam and optimal RX beam.

According to an embodiment, if strength of a signal received through the determined RX beam is less than or equal to a threshold (e.g., if a situation is changed), the processor may re-determine the optimal RX beam and the optimal TX beam by re-performing beam training by the use of some RX beams among the plurality of RX beams supported by the electronic device and some TX beams among the plurality of TX beams supported by the BS.

According to an embodiment, if strength of a signal received through the determined optimal RX beam is less than or equal to a threshold, the processor may determine whether a posture of the electronic device is changed, and only when the posture of the electronic device is changed, may re-determine the optimal RX beam and the optimal TX beam by re-performing beam training by the use of some RX beams and some TX beams.

According to an embodiment, the processor may determine whether a direction (an LOS direction) from the electronic device to the BS is changed via the second communication circuit, and if the LOS direction is changed, may determine that the posture of the electronic device is changed. According to an embodiment, the processor may determine whether the posture of the electronic device is changed based on information acquired via a sensor module (e.g., a gyro sensor, an acceleration sensor) for identifying the posture of the electronic device.

Although it has been described above that the electronic device determines the optimal TX beam and optimal RX beam for one BS through the operations 801 to 805, according to various embodiments of the present disclosure, the electronic device may perform the operations 801 to 805 with respect to each of a plurality of BSs located within a designated distance from the electronic device to determine the optimal TX beam and optimal RX beam for each BS. In this case, among the plurality of BSs located within the designated distance from the electronic device, the electronic device may determine one BS having greatest strength of a signal received through the optimal RX beam for each BS as a BS (e.g., a serving BS) for data communication.

According to various embodiments, the electronic device may identify a location and/or direction of the BS by using UWB communication, and may perform beam training by using some RX beams determined based on the identified location and/or direction among a plurality of RX beams supported by the electronic device and some TX beams determined based on the identified location and/or direction among a plurality of TX beams supported by the BS. Therefore, a time required for beam training can be reduced and electric current consumption can be decreased, compared to a case where beam training is performed by using all RX beams and all TX beams.

Figure 10A:
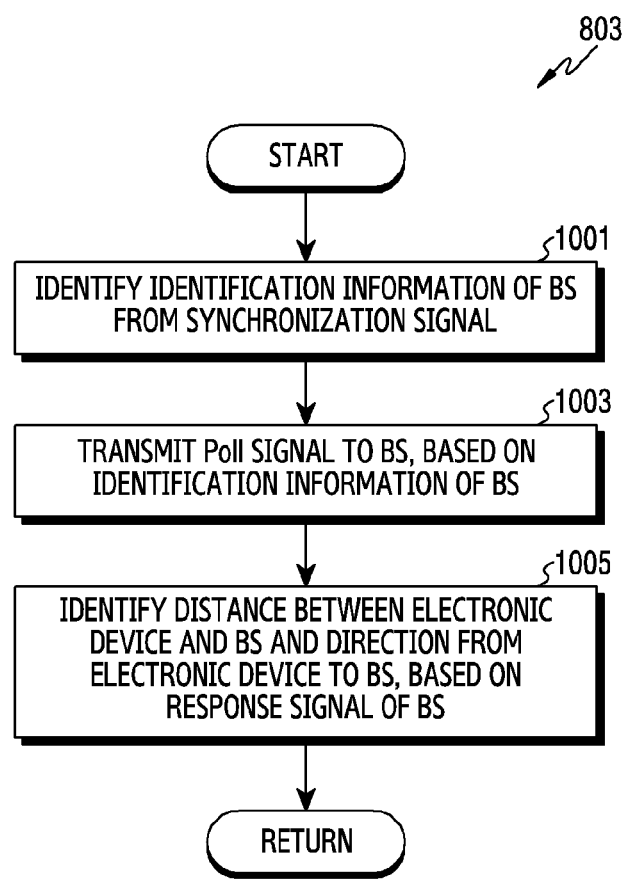
FIG. 10A is a flowchart illustrating a method in which an electronic device identifies a direction from the electronic device to a BS according to various embodiments.
Figure 10B:
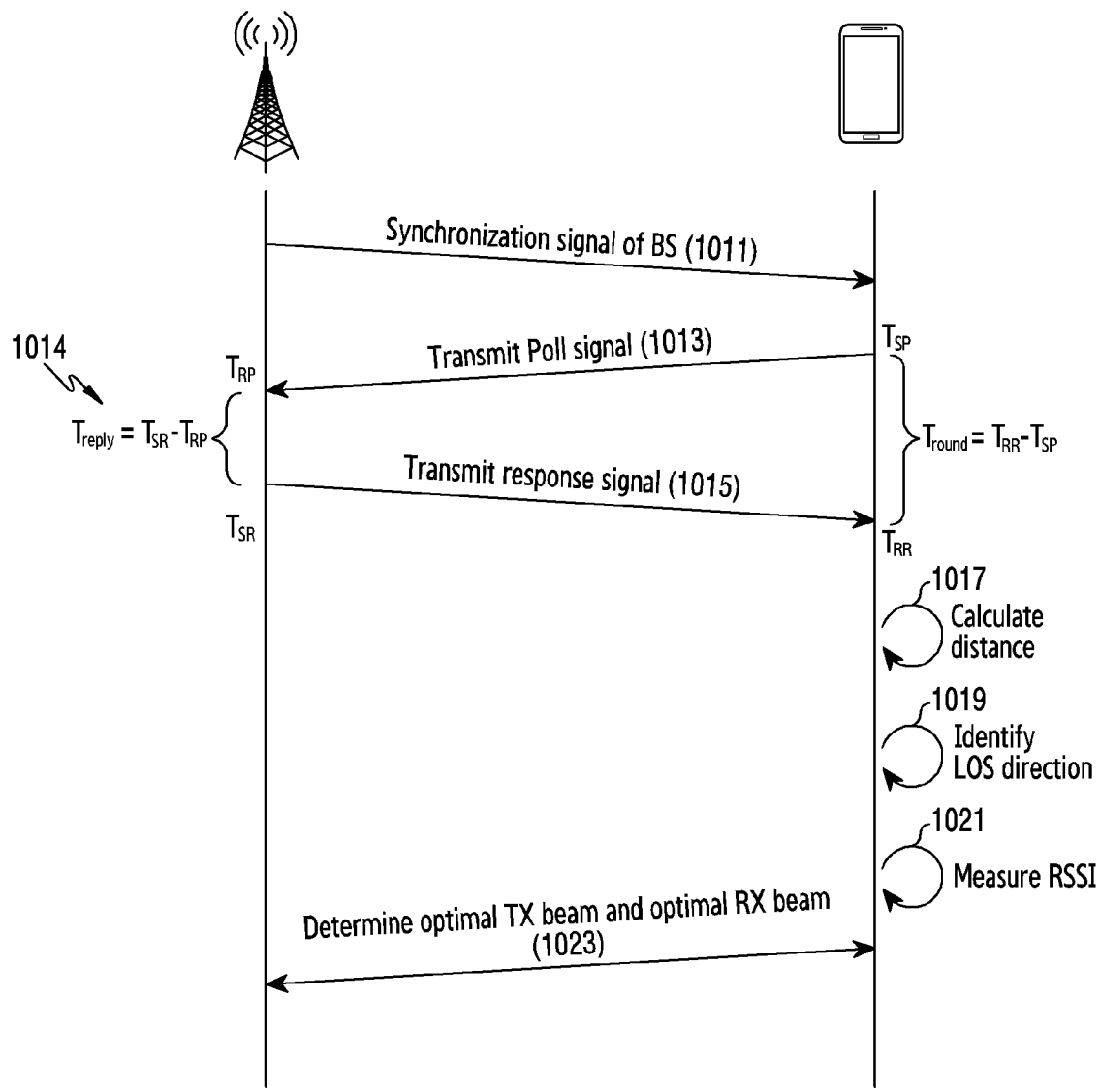
FIG. 10B is an exemplary diagram illustrating a method in which an electronic device identifies a direction from the electronic device to a BS by using Ultra Wide Band (UWB) network communication according to various embodiments.

FIG. 10A is a flowchart illustrating a method in which an electronic device identifies a direction from the electronic device to a BS according to various embodiments, and FIG. 10B is an exemplary diagram illustrating a method in which an electronic device identifies a direction from the electronic device to a BS by using UWB network communication according to various embodiments.

Referring to FIG. 10A and FIG. 10B, in operation 1001, a processor (e.g., the processor 120 of FIG. 1 and FIG. 2, the processor 510 of FIG. 1) of the electronic device (e.g., the electronic device 101 of FIG. 1 to FIG. 4, the electronic device 500 of FIG. 5) may identify identification information of the BS from a synchronization signal transmitted from the BS (e.g., the BS 105 of FIG. 3 and FIG. 4). For example, in response to receiving the synchronization signal via a first communication circuit (e.g., the second communication processor 214 and third RFIC 226 of FIG. 2, the first communication circuit 530 of FIG. 5) (operation 1011 of FIG. 10B), the processor may identify the identification information (e.g., UWB mac ID) of the BS from the synchronization signal. According to an embodiment, the processor may further identify, from the synchronization signal, information on at least one of the number of beams supported by the BS, a transmission timing of the synchronization signal, a transmission duration of the synchronization signal, a transmission period of the synchronization signal, and authentication information (e.g., UWB authentication information).

In operation 1003, the processor may transmit a signal defined for positioning (e.g., a poll signal defined in the UWB standard) to the BS via a second communication circuit (e.g., the second communication circuit 540 of FIG. 5) on the basis of the identification information of the BS. For example, the processor may transmit the poll signal to the BS via the second communication circuit by using the identification information (e.g., UWB mac ID) of the BS (operation 1013 of FIG. 10B). In response to transmitting the poll signal to the BS, the processor may store information on a timing TSP at which the poll signal is transmitted in a memory (e.g., the memory 130 of FIG. 1 and FIG. 2, the memory 520 of FIG. 5).

According to an embodiment, in response to receiving the poll signal, the BS may generate a response signal (operation 1014 of FIG. 10B), and may transmit the generated response signal to the electronic device through second network communication (UWB network communication) (operation 1015 of FIG. 10B). The response signal may include information on a response delay time (e.g., information on a timing TRP at which the poll signal is received and a timing TSR at which the response signal is transmitted, or information on a difference Treply between the timing TRP at which the poll signal is received and the timing TSR at which the response signal is transmitted).

In operation 1005, in response to the response signal of the BS, the processor may calculate a distance between the electronic device and the BS (operation 1017 of FIG. 10B), and may identify a direction (e.g., an LOS direction) from the electronic device to the BS (operation 1019 of FIG. 10B). For example, the processor may substitute a difference Tround between a timing TSP at which the poll signal is transmitted and a timing TRR at which the response signal is received and information (e.g., Treply) on a response delay time to Equation 3 to identify a signal arrival time TP between the electronic device and the BS and identify a distance between the electronic device and the BS by using the signal arrival time TP and a signal speed (e.g., speed of light).

$$Tp = \frac{Tround - Treply}{2} \quad (3)$$

In equation (3), Tp denotes a signal arrival time between the electronic device and the BS, Tround denotes a difference between a timing TRR at which a response signal is received and a timing TSP at which a poll signal is transmitted, and Treply denotes a difference between a timing TSR at which a response signal is transmitted and a timing TRP at which a poll signal is received. For another example, upon receiving the response signal via the second communication circuit, the processor may identify a direction from the electronic device to the BS by using the positioning technology of FIG. 6A and FIG. 6B.

Upon determining the distance and the LOS direction, the processor may measure an RSSI for some TX beams corresponding to the LOS direction among a plurality of TX beams supported by the BS in response to a synchronization signal transmission period (operation 1021 of FIG. 10B), and may determine an optimal RX beam and optimal TX beam for the BS (operation 1023 oaf FIG. 10B). Since the operations 1021 and 1023 are similar to the operations 320 and 330 of FIG. 3, detailed descriptions thereof will be omitted.

Although FIG. 10A and FIG. 10B are described above by using one BS for convenience of explanation, a location of the electronic device may be identified through communication with a plurality of (e.g., 3) BSs, and an LOS direction for each BS may be identified.

Figure 11:
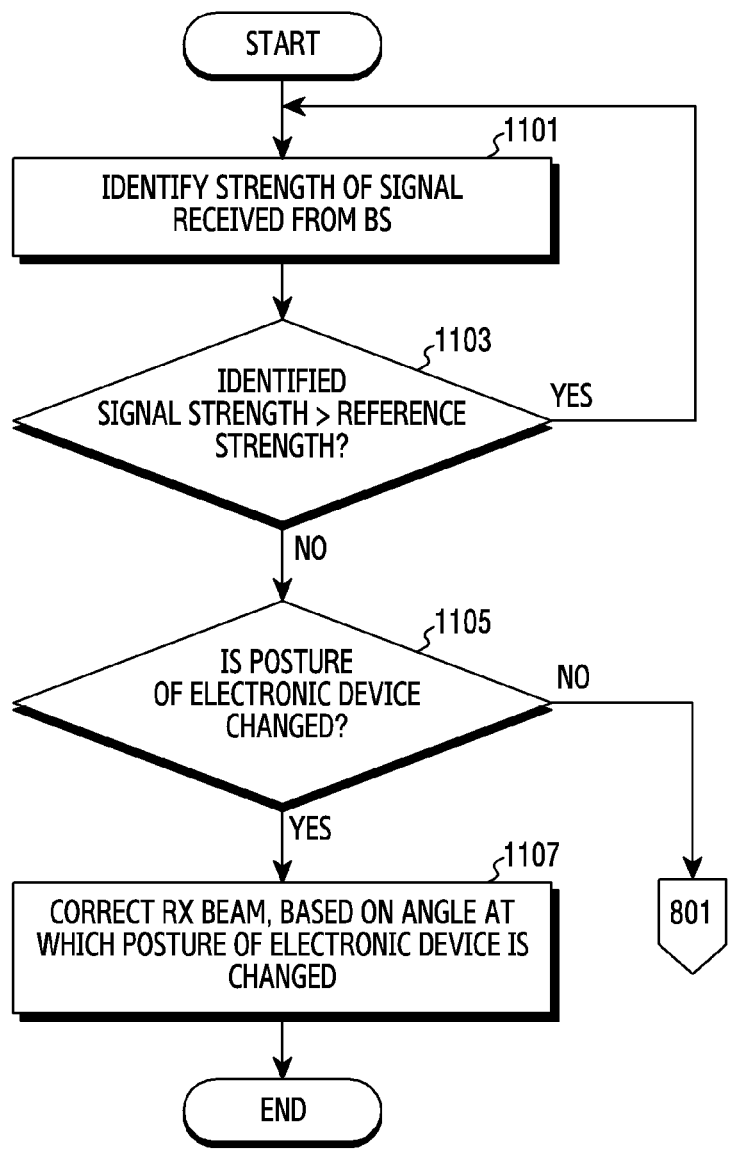
FIG. 11 is a flowchart illustrating an example of a method in which an electronic device corrects an optimal Reception (RX) beam for a BS according to various embodiments.

FIG. 11 is a flowchart illustrating an example of a method in which an electronic device corrects an optimal RX beam for a BS according to various embodiments. For example, FIG. 11 may be performed after the operation 805 of FIG. 8.

Referring to FIG. 11, in operation 1101, a processor (e.g., the processor 120 of FIG. 1 and FIG. 2, the processor 510 of FIG. 1) of the electronic device (e.g., the electronic device 101 of FIG. 1 to FIG. 4, the electronic device 500 of FIG. 5) may identify strength (an RSSI) of a signal received from the BS (e.g., the BS 105 of FIG. 3 and FIG. 4) through an optimal RX beam determined through beam training. For example, the processor may identify the signal strength by monitoring strength of a signal transmitted by the BS through an optimal TX beam on a real time basis while performing data communication with the BS through the optimal RX beam determined through beam training among a plurality of beams supported by a first communication circuit (e.g., the second communication processor 214 and third RFIC 225 of FIG. 2, the first communication circuit 530 of FIG. 5). For another example, the processor may identify the signal strength by monitoring strength of a signal transmitted by the BS through the optimal TX beam with a designated period while performing data communication with the BS through the optimal RX beam determined through beam training among a plurality of beams supported by the first communication circuit.

In operation 1103, the processor may determine whether the identified signal strength exceeds reference strength. If the identified signal strength exceeds the reference strength, the processor may return to the operation 1101. Otherwise, if the identified signal strength does not exceed the reference strength, the processor may proceed to operation 1105.

In operation 1105, the processor may determine whether a posture of the electronic device is changed. For example, the processor may identify a direction from the electronic device to the BS via a second communication circuit (e.g., the second communication circuit 540 of FIG. 5) and thus determine whether the posture of the electronic device is changed from a posture of a timing at which beam training is performed. For another example, the processor may identify the posture of the electronic device via a sensor module (e.g., the sensor module 176 of FIG. 1) and thus determine whether the posture of the electronic device is changed from the posture of the timing at which beam training is performed. If the posture of the electronic device is not changed, the processor may determine that a communication environment between the electronic device and the BS deteriorates (e.g., an object is located between the electronic device and the BS), and thus may correct the optimal RX beam for the BS. If the posture of the electronic device is changed, the processor may proceed to operation 1107.

In operation 1107, the processor may correct (e.g., change) the optimal RX beam on the basis of an angle at which the posture of the electronic device is changed. For example, the processor may change an RX beam corresponding to the angle at which the posture of the electronic device is changed (e.g., when changed by 30 degrees to the right, an RX beam spaced apart by 30 degrees (or similar degrees) to the left from an optimal RX beam of a time before the posture is changed) among a plurality of beams supported by the electronic device to the optimal RX beam for the BS. The processor may perform data communication with the BS by using the changed optimal RX beam.

According to some embodiments, the processor may change the optimal TX beam. For example, if the RSSI is less than or equal to the reference strength even after the optimal RX beam is changed, the processor may change the optimal TX beam. For example, the processor may request the BS to transmit a signal by using a TX beam adjacent to the optimal TX beam (e.g., a TX beam before or after the optimal TX beam).

According to some embodiments, if the RSSI is less than or equal to the reference strength even after the optimal RX beam and the optimal TX beam are changed, the procedure may return to the operation 801.

Figure 12:
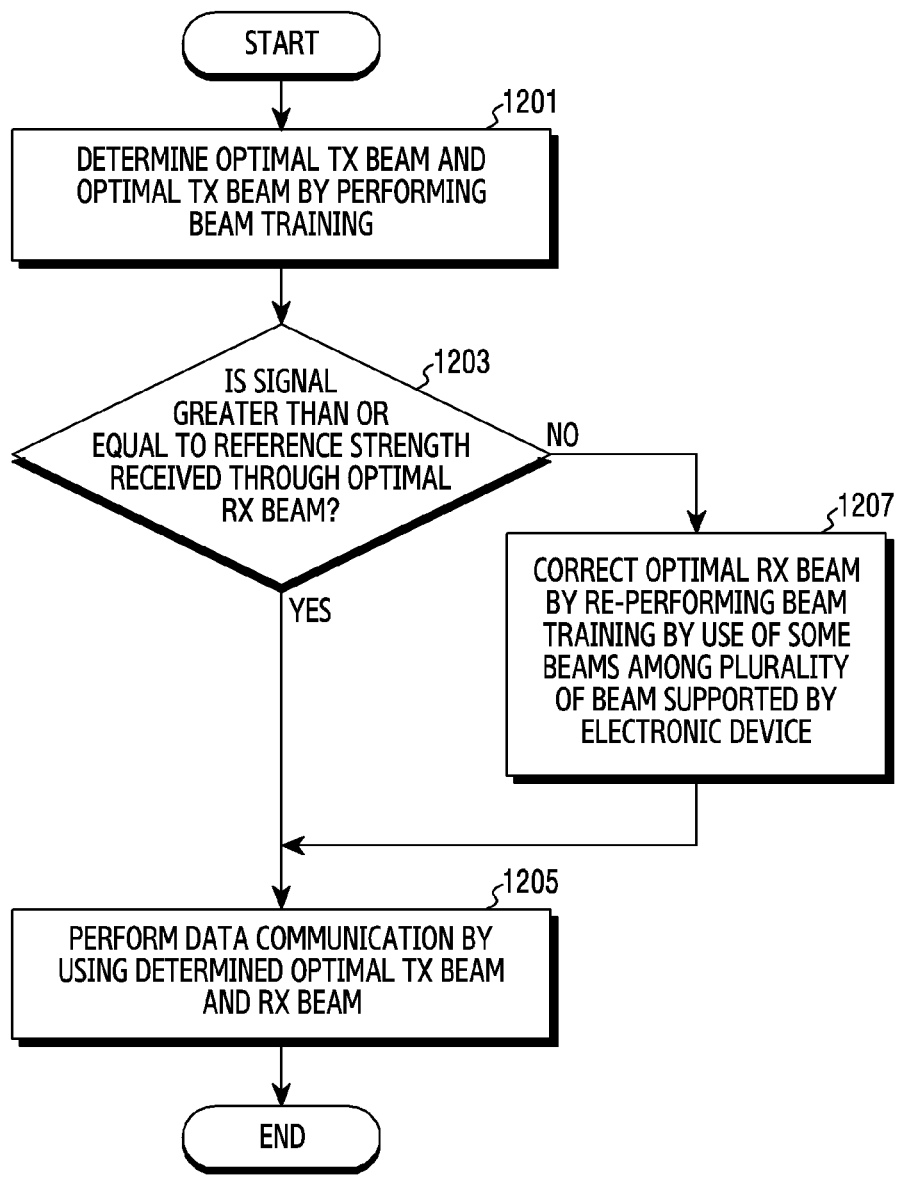
FIG. 12 is a flowchart illustrating another example of a method in which an electronic device corrects an optimal RX beam for a BS according to various embodiments.

FIG. 12 is a flowchart illustrating another example of a method in which an electronic device corrects an optimal RX beam for a BS according to various embodiments. For example, FIG. 12 may be performed after the operation 805 of FIG. 8.

Referring to FIG. 12, in operation 1201, a processor (e.g., the processor 120 of FIG. 1 and FIG. 2, the processor 510 of FIG. 1) of the electronic device (e.g., the electronic device 101 of FIG. 1 to FIG. 4, the electronic device 500 of FIG. 5) may determine an optimal TX beam and an optimal RX beam through beam training. The operation 1201 may be similar to the operation 805.

In operation 1203, the processor may identify whether a signal with strength greater than or equal to reference strength is received through the optimal RX beam. For example, the processor may identify strength (an RSSI) of a signal received from the BS (e.g., the BS 105 of FIG. 3 and FIG. 4) through the optimal RX beam determined through beam training, and may identify whether the identified signal strength is greater than or equal to (or exceeds) the reference strength. For example, the processor may identify the signal strength by monitoring strength of a signal transmitted by the BS through an optimal TX beam on a real time basis while performing data communication with the BS through the optimal RX beam determined through beam training among a plurality of beams supported by a first communication circuit (e.g., the second communication processor 214 and third RFIC 225 of FIG. 2, the first communication circuit 530 of FIG. 5). For another example, the processor may identify the signal strength by monitoring strength of a signal transmitted by the BS through the optimal TX beam with a designated period while performing data communication with the BS through the optimal RX beam determined through beam training among a plurality of beams supported by the first communication circuit.

If the identified RSSI is greater than or equal to (or exceeds) the reference strength, the processor may proceed to operation 1205.

In operation 1205, the processor may perform data communication with the BS by using the determined optimal TX beam and RX beam.

Meanwhile, if the identified RSSI is greater than or equal to (or exceeds) the reference strength, the process may proceed to operation 1207.

In operation 1207, the processor may correct the optimal RX beam by re-performing beam training by the use of some beams among a plurality of RX beams supported by the electronic device. For example, the processor may change the optimal RX beam for the BS by re-performing beam training for some RX beams among the plurality of RX beams supported by the electronic device. The processor may perform data communication with the BS by using the determined optimal RX beam.

According to various embodiments of the present disclosure, a method of selecting a beam in an electronic device (e.g., the electronic device 101, 500) may comprises: receiving from a base station (BS) a synchronization signal comprising identification information of the BS via a first communication circuit (e.g., the second communication processor 214 and the third RFIC 226, the first communication circuit 530) of the electronic device; identifying a direction from the electronic device to the BS by transmitting and receiving at least one signal with respect to the BS via the second communication circuit (e.g., the second communication circuit 540) of the electronic device based on the identification information of the BS; and performing beam training by using some beams corresponding to the identified direction among a plurality of beams supported by the electronic device.

According to various embodiments, the first communication circuit may comprise a new radio (NR) communication circuit, and the second communication circuit may comprise an ultra wide band (UWB) communication circuit.

According to various embodiments, the identifying of the direction from the electronic device to the BS may comprise: transmitting a poll signal to the BS based on the identification information of the BS; receiving a response signal for the poll signal from the BS; and identifying a distance between the electronic device and the BS and a direction from the electronic device to the BS based on the response signal.

According to various embodiments, the method may further comprises: determining an optimal transmission (TX) beam and optimal reception (RX) beam for the BS through the beam training; and performing data communication with the BS by using the determined optimal TX beam and the determined optimal RX beam.

According to various embodiments, the method may further comprise transmitting information on the determined optimal TX beam to the BS via the first communication circuit in response to determining the optimal TX beam.

According to various embodiments, the method may further comprise: identifying strength of a signal received through the optimal RX beam while performing data communication with the BS; if the identified signal strength is less than or equal to reference strength, determining whether a posture of the electronic device is changed from a posture of a timing at which the beam training is performed; and if the posture of the electronic device is changed from the posture of the timing at which the beam training is performed, correcting the optimal RX beam based on an angle at which the posture of the electronic device is changed.

According to various embodiments, the determining of whether the posture of the electronic device is changed from the posture of the time at which the beam training is performed may comprise determining whether the posture of the electronic device is changed from the posture of the timing at which the beam training is performed by identifying the direction from the electronic device to the BS via the second communication circuit.

According to various embodiments, the determining of whether the posture of the electronic device is changed from the posture of the time at which the beam training is performed may comprise determining whether the posture of the electronic device is changed from the posture of the timing at which the beam training is performed based on information acquired via the sensor module.

According to various embodiments, the method may further comprise: receiving a different synchronization signal comprising the identification information of the BS from the BS via the first communication circuit, if the posture of the electronic device is not changed; identifying a direction from the electronic device to the BS by transmitting/receiving at least one signal with respect to the BS via the second communication circuit based on the BS's identification information comprised in the received different synchronization signal; and changing the optimal RX beam for the BS by re-performing beam training by the use of some beams corresponding to the identified direction among a plurality of beams supported by the electronic device.

According to various embodiments, the method may further comprise: identifying strength of a signal received through the optimal RX beam while performing data communication with the BS; and if the identified signal strength is less than or equal to reference strength, changing the optimal RX beam for the BS by re-performing beam training by the use of some beams among a plurality of beams supported by the electronic device.

Various embodiments of the present disclosure can decrease a deterioration of data transmission/reception between an electronic device and a serving BS by minimizing an operation (or time) in which the electronic device searches for a TX beam and RX beam for each neighboring BS. In addition, various embodiments of the present disclosure can decrease power consumed for beam training in the electronic device by minimizing an operation (or time) in which the electronic device searches for a TX beam and RX beam for each neighboring BS.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136, or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separated and disposed to other component. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a first communication circuit;
a second communication circuit;
a processor operatively coupled with the first communication circuit and the second communication circuit; and
a memory operatively coupled with the processor, wherein the memory stores instructions, when executed, causing the processor to:
receive, from a base station (BS), a synchronization signal comprising identification information of the BS via the first communication circuit;
transmit, to the BS, a poll signal based on the identification information of the BS;
receive, from the BS, a response signal for the poll signal;
identify, based on the response signal, a distance between the electronic device and the BS;
identify, based on the response signal, a direction from the electronic device to the BS; and
perform beam training by using some beams corresponding to the identified direction among a plurality of beams supported by the electronic device.

2. The electronic device of claim 1,
wherein the first communication circuit comprises a new radio (NR) communication circuit, and
wherein the second communication circuit comprises an ultra wide band (UWB) communication circuit.

3. The electronic device of claim 1, wherein the instructions cause the processor to:
determine, based on the beam training, an optimal transmission (TX) beam and optimal reception (RX) beam for the BS; and
perform a data communication with the BS by using the determined optimal TX beam and the determined optimal RX beam.

4. The electronic device of claim 3, wherein the instructions cause the processor to transmit, to the BS, information on the determined optimal TX beam via the first communication circuit in response to determining the optimal TX beam.

5. The electronic device of claim 3, wherein the instructions cause the processor to:
identify strength of a signal received through the optimal RX beam while performing the data communication with the BS;
in response to the identified strength of the signal being less than or equal to reference strength, determine whether a posture of the electronic device is changed from a posture of a timing at which the beam training is performed; and
in response to the posture of the electronic device being changed from the posture of the timing at which the beam training is performed, correct the optimal RX beam based on an angle at which the posture of the electronic device is changed.

6. The electronic device of claim 5, wherein the instructions cause the processor to determine, based on an identification of the direction from the electronic device to the BS via the second communication circuit, whether the posture of the electronic device is changed from the posture of the timing at which the beam training is performed.

7. The electronic device of claim 5, further comprising a sensor,
wherein the instructions cause the processor to determine, based on information acquired via the sensor, whether the posture of the electronic device is changed from the posture of the timing at which the beam training is performed.

8. The electronic device of claim 5, wherein the instructions cause the processor to:
receive, from the BS via the first communication circuit, a different synchronization signal comprising the identification information of the BS, in response to the posture of the electronic device not changing;
identify the direction from the electronic device to the BS by exchanging at least one signal with respect to the BS via the second communication circuit based on the identification information of the BS comprised in the received different synchronization signal; and
change the optimal RX beam for the BS by re-performing beam training that uses the some beams corresponding to the identified direction among the plurality of beams supported by the electronic device.

9. The electronic device of claim 3, wherein the instructions cause the processor to:
identify strength of a signal received through the optimal RX beam while performing a data communication with the BS; and
in response to the identified strength of the signal being less than or equal to reference strength, change the optimal RX beam for the BS by re-performing beam training that uses the some beams among the plurality of beams supported by the electronic device.

10. A method of an electronic device for selecting a beam, the method comprising:
receiving, from a base station (BS), a synchronization signal comprising identification information of the BS via a first communication circuit of the electronic device;
identifying a direction from the electronic device to the BS by exchanging at least one signal with respect to the BS via a second communication circuit of the electronic device based on the identification information of the BS; and
performing beam training by using some beams corresponding to the identified direction among a plurality of beams supported by the electronic device,
wherein identifying the direction from the electronic device to the BS comprises:
transmitting, to the BS, a poll signal based on the identification information of the BS;
receiving, from the BS, a response signal for the poll signal; and
identifying, based on the response signal, a distance between the electronic device and the BS and the direction from the electronic device to the BS.

11. The method of claim 10,
wherein the first communication circuit comprises a new radio (NR) communication circuit, and
wherein the second communication circuit comprises an ultra wide band (UWB) communication circuit.

12. The method of claim 10, further comprising:
determining, based on the beam training, an optimal transmission (TX) beam and optimal reception (RX) beam for the BS; and
performing a data communication with the BS by using the determined optimal TX beam and the determined optimal RX beam.

13. The method of claim 12, further comprising transmitting, to the BS, information on the determined optimal TX beam via the first communication circuit in response to determining the optimal TX beam.

14. The method of claim 12, further comprising:
identifying strength of a signal received through the optimal RX beam while performing the data communication with the BS;
based on identifying that the strength of the signal is less than or equal to reference strength, determining whether a posture of the electronic device is changed from a posture of a timing at which the beam training is performed;

determining whether the posture of the electronic device is changed from the posture of the timing at which the beam training is performed; and based on determining that the posture of the electronic device is changed from the posture of the timing at which the beam training is performed, correcting the optimal RX beam based on an angle at which the posture of the electronic device is changed.

15. The method of claim 14, wherein determining whether the posture of the electronic device is changed from the posture of the timing at which the beam training is performed comprises determining whether the posture of the electronic device is changed from the posture of the timing at which the beam training is performed by identifying the direction from the electronic device to the BS via the second communication circuit.

16. The method of claim 14, wherein determining whether the posture of the electronic device is changed from the posture of the timing at which the beam training is performed comprises determining whether the posture of the electronic device is changed from the posture of the timing at which the beam training is performed based on information acquired via a sensor.

17. The method of claim 14, further comprising:

receiving, from the BS via the first communication circuit, a different synchronization signal comprising the identification information of the BS when the posture of the electronic device is not changed;

identifying the direction from the electronic device to the BS by exchanging at least one signal with respect to the BS via the second communication circuit based on the identification information of the BS comprised in the received different synchronization signal; and changing the optimal RX beam for the BS by re-performing beam training that uses the some beams corresponding to the identified direction among the plurality of beams supported by the electronic device.

18. The method of claim 12, further comprising:

identifying strength of a signal received through the optimal RX beam while performing a data communication with the BS; and based on identifying that the strength of the signal is less than or equal to reference strength, changing the optimal RX beam for the BS by re-performing beam training that uses the some beams among the plurality of beams supported by the electronic device.

* * * * *